United States Patent
Longhi, Jr. et al.

(10) Patent No.: US 6,923,837 B2
(45) Date of Patent: Aug. 2, 2005

(54) CONSECUTIVELY WOUND OR STACKED BATTERY CELLS

(75) Inventors: Alfred J. Longhi, Jr., Alvin, TX (US); M. Zafar A. Munshi, Missouri City, TX (US)

(73) Assignee: Lithium Power Technologies, Inc., Manvel, TX (US)

( * ) Notice: Subject to any disclaimer, the term of this patent is extended or adjusted under 35 U.S.C. 154(b) by 402 days.

(21) Appl. No.: 10/082,946

(22) Filed: Feb. 26, 2002

(65) Prior Publication Data

US 2003/0162086 A1 Aug. 28, 2003

(51) Int. Cl.⁷ .............................................. H01M 10/38
(52) U.S. Cl. ............................ 29/623.1; 429/94; 83/39
(58) Field of Search ......................... 29/623.1; 429/94; 83/39

(56) References Cited

U.S. PATENT DOCUMENTS

| | | | |
|---|---|---|---|
| 3,921,041 A | 11/1975 | Stockman | 317/260 |
| 4,028,595 A | 6/1977 | Stockman | 361/328 |
| 4,975,095 A | 12/1990 | Strickland et al. | 29/623.1 |
| 5,139,902 A | 8/1992 | Drews et al. | 429/234 |
| 5,508,122 A | 4/1996 | Narukawa et al. | 429/94 |
| 5,746,780 A | 5/1998 | Narukawa et al. | 29/623.1 |
| 6,038,473 A | 3/2000 | Olson et al. | 607/5 |
| 6,187,062 B1 | 2/2001 | Oweis et al. | 29/623.1 |
| 6,190,793 B1 | 2/2001 | Barton et al. | 429/34 |

FOREIGN PATENT DOCUMENTS

JP       1-276567      * 7/1989

OTHER PUBLICATIONS

ITW Paktron Film Capacitor Catalog (No Date).

* cited by examiner

Primary Examiner—John S. Maples
(74) Attorney, Agent, or Firm—Mark E. Scott; Conley Rose, P.C.

(57) ABSTRACT

The specification discloses a consecutively wound or stacked battery system and a method for making these devices. In one aspect, battery cells are wound consecutively, separated by insulating layers, to form an integral battery system capable of producing multiple voltages. In a second, but related, aspect, multiple battery cells are wound consecutively on a large diameter mandrel, cut in a radial plane, and laid flat to form stacked battery systems capable of producing multiple voltages. Whether remaining in the consecutively wound configuration, or being cut to become a stacked cell configuration, each cell in these configurations may be selectively coupled to other cells within its consecutive winding or stack to produce desired output voltages and current ratings. In the case of the stacked battery system, this battery system may be selectively cut to provide amperage capacities to order. Moreover, the consecutively wound or stacked battery systems may also include capacitors, fuel cells, and the like, wound in the same fashion.

26 Claims, 5 Drawing Sheets

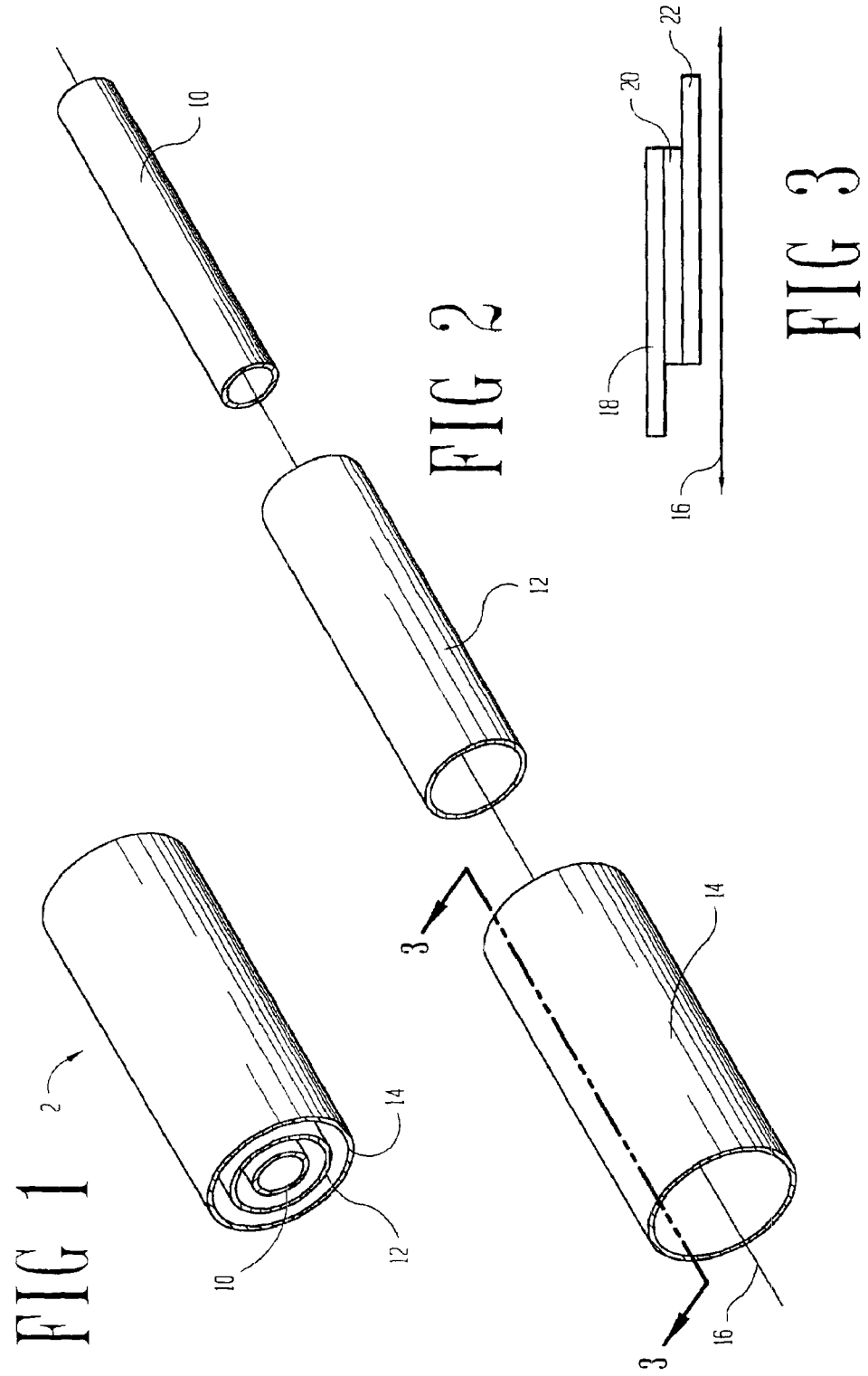

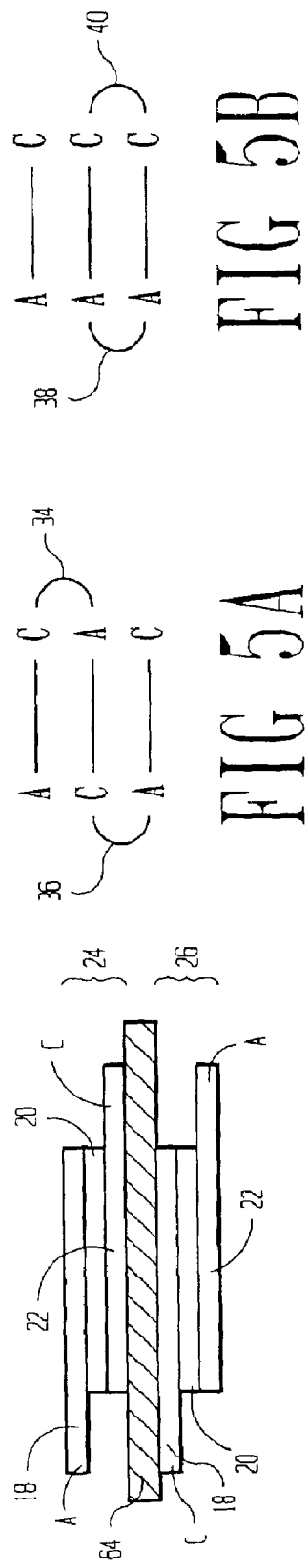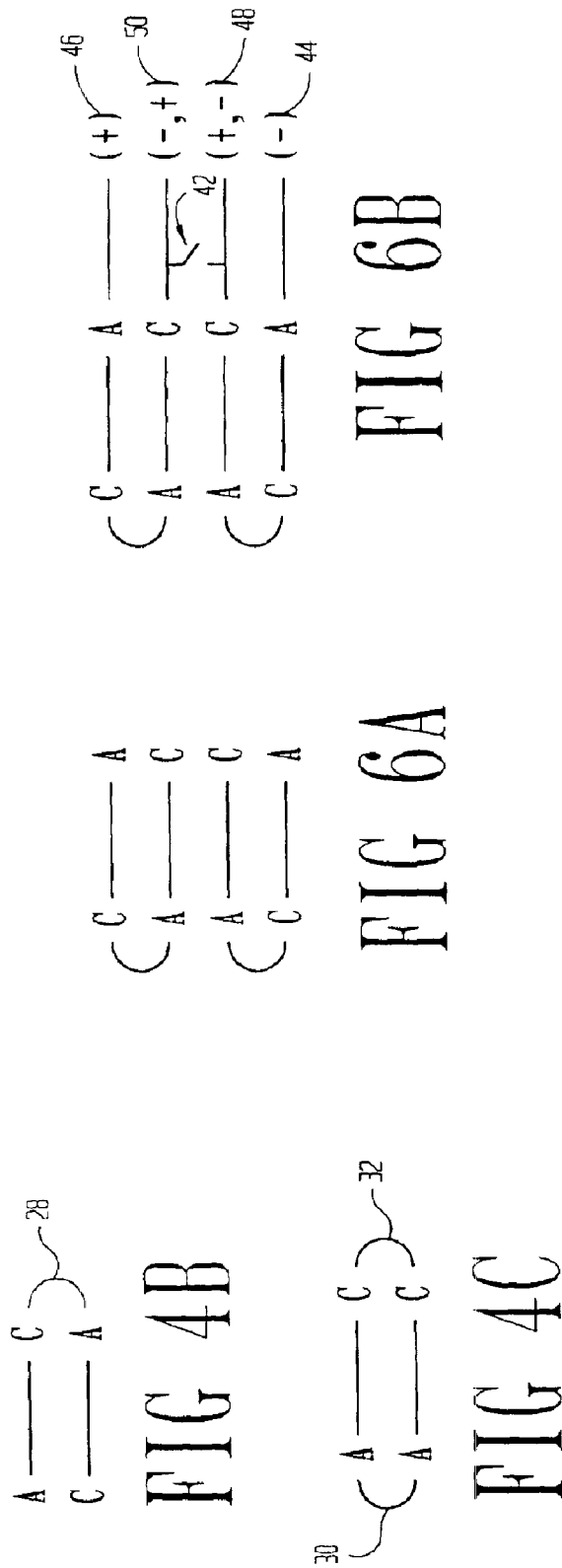

US 6,923,837 B2

CONSECUTIVELY WOUND OR STACKED BATTERY CELLS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed to batteries. More particularly, the preferred embodiments of the present invention are directed to consecutively wound or stacked battery cells and battery systems.

2. Description of the Related Art

It is common in the battery industry to build battery cells by winding long sheets of anode material and cathode material, separated by a porous layer, around a mandrel to form a generally circular single cell battery. After the winding process completes, some form of liquid or viscous electrolyte is inserted, usually into a hole at the center of the circular winding, and the electrolyte is allowed to fill the porous layer between the anode and the cathode sheets. U.S. Pat. No. 4,975,095 to Strickland et al. exemplifies a method and related system for performing the related art winding of a cell, with the central opening 72 of the winding (see FIG. 6) being the location where liquid electrolyte is forced into the winding. Windings for battery cells need not be circular however. U.S. Pat. No. 6,190,794 to Wyser is exemplary of a system where the winding is non-circular, in this case elliptical, as is the disclosure of U.S. Pat. No. 5,746,780 to Narukawa, et al.

Whether circular or elliptical, related art battery windings are only a single cell, and therefore only operate at a single voltage; however, many modern electronic devices need multiple voltages to operate correctly. U.S. Pat. No. 6,038,473 (hereinafter the '473 patent) to Olson et al. describes a defibrillator battery pack in which one set of individual battery cells is used to charge the defibrillator, and a second set of individual battery cells is used to produce an operating voltage for control electronics. In the defibrillator application, and in any related art application requiring multiple voltages, the related art approach has been to provide individual battery cells connected in parallel and/or series as necessary to supply the voltages and currents required. In cases where high initial currents are required, for example in-rush current associated with starting electrical motors and the like, individual capacitor cells may likewise be wired in parallel with the battery cells to supply the needed starting current. However, battery systems with multiple voltages achieved by connecting a plurality of individual battery cells are expensive to build.

When providing multiple voltages for electronic devices, or wiring capacitors in parallel with battery cells to meet current demands, the battery cells and capacitors of the related art are connected by coupling wires from the individual components (battery cells and capacitors), and then coupling the wires to terminals of an external casing such that all the internal components are within one battery pack. However, there are still multiple battery cells, and possibly capacitors, within the battery pack. As can be appreciated from this description, assembling battery packs in this manner is very labor intensive, thus contributing to the expense of construction.

The capacitor industry has made multiple capacitors in a single winding, as exemplified in U.S. Pat. No. 4,028,595 (hereinafter the '595 patent) to Stockman. In particularly, the '595 patent discloses that multiple sheets of dielectric material with metal film on one side are rolled together on a mandrel to create a first capacitor. After winding a number of turns, a portion of the metal film on each of the sheets of dielectric material is removed, yet the windings are continued with the same dielectric sheets. Additional pieces of dielectric material may be placed between the sheets starting at the location where the portion of the metal on each sheet is removed. In this way, two capacitors, possibly with different voltage ratings, that share dielectric material are produced with a single winding. While it is possible to build capacitors that share dielectric material, the electrolyte of different batteries may not be shared between battery cells.

A second, but related, problem faced by the battery industry is providing batteries of correct amperage capacity. That is, while any battery may have at its output terminals a necessary voltage, the battery may not have the amperage capacity to hold the rated terminal voltage at required amperage demands. The solution of the related art is to couple a plurality of individual batteries in parallel until the total amperage capacity of the battery system matches that of the intended load. This procedure too is labor intensive, and requires battery manufacturers to have significant stocks of batteries of varying capacity to meet possible demand.

Thus, what is needed in the art is a mechanism to provide an integral unit multiple cell battery without the need of externally connecting multiple single cell batteries to produce the desired voltages and currents.

BRIEF SUMMARY OF SOME OF THE PREFERRED EMBODIMENTS

The problems noted above are solved in large part by a consecutively wound or stacked battery system in which a plurality of devices are constructed by consecutively winding those devices on top of each other to produce a multiple device system in a single integral unit. The multiple devices could be battery cells, fuel cells, capacitors and the like. More particularly, the preferred embodiments are directed to consecutively wound lithium battery cells having solid polymer electrolyte, each battery cell separated by an insulating layer that extends beyond an anode or cathode layer in each of the battery cells. Once the requisite number of cells are wound into the consecutively wound system, the axial or rolled ends of the consecutively wound system are preferably coated or shooped with a conductive material. A portion of this conductive material is preferably removed by brushing such that the conductive material cannot provide continuity from one cell to another. Thus, each battery cell in the consecutively wound unit is electrically isolated from other battery cells. By the use of external jumpers between the battery cells at the shooping, the plurality of consecutively wound battery cells can be connected in any series or parallel fashion to produce desired voltages and currents.

In an alternative, but related, embodiment of the preferred embodiments, the consecutively wound battery system is wound on a cylindrical mandrel having a large (for example, two to five foot) diameter mandrel. The process is continued as described with respect to the previous paragraph; however, once the winding is complete the consecutively wound battery is cut on one side along the radial plane intersecting an axis of the winding. The cut consecutively wound battery is then laid flat to produce a substantially rectangular shaped stacked battery system. While it is possible to use the stacked battery system directly, preferably the stacked battery is cut along its width to produce a desired length, and thus a desired capacity. Additionally, a substantially rectangular shaped battery may also be cut, either during the winding process or thereafter, to a particular width as a further adjustment of the capacity. One consecutively wound battery system cut to become a stacked battery may produce many battery systems having varying voltages (by coupling in parallel or series the plurality of batteries in the stack) and current capacities (by cutting to produce a particular length, width or both) as needed or required.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments, reference will now be made to the accompanying drawings in which:

FIG. 1 shows a simplified perspective end view of a plurality of consecutively wound battery cells of the preferred embodiment;

FIG. 2 shows a perspective view of the battery system of FIG. 1 with the battery cells removed along their axis;

FIG. 3 shows the cross-section of one turn of layered material of a battery cell;

FIG. 4A shows a cross-section of a portion of the windings of a two battery cell consecutively wound battery system;

FIG. 4B shows, in graphical form, another way to couple two battery cells of a consecutively wound battery system;

FIG. 4C shows, in graphical form, a way to couple two battery cells of a consecutively wound battery system;

FIG. 5A shows, in graphical form, another way to couple three battery cells of a consecutively wound battery system;

FIG. 5B shows, in graphical form, another way to couple three battery cells of a consecutively wound battery system;

FIG. 6A shows, in graphical form, a way to couple four battery cells of a consecutively wound battery system to produce two output voltages;

FIG. 6B shows, in graphical form, a way to couple four battery cells of a consecutively wound battery system to selectively provide a single voltage or two voltages;

NOTATION AND NOMENCLATURE

Figure 7B:
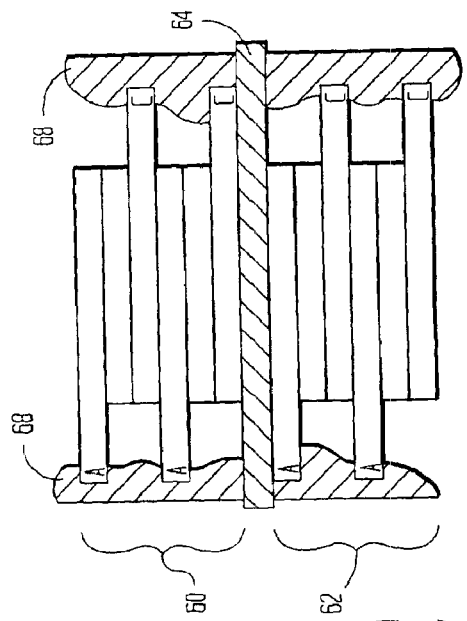
FIG. 7B shows the system of FIG. 7A after shooping has taken place.

Certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ".

Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The preferred embodiments are directed to consecutively wound or stacked battery cells and battery systems. The battery cells of the various embodiments described herein were developed in the context of lithium metal coated anodes and cathodes with solid polymer electrolyte. The solid polymer electrolyte is described in detail in copending application Ser. No. 09/388,741 titled, "Solid Polymer Electrolyte", now U.S. Pat. No. 6,645,675 which is incorporated by reference as if reproduced in full below. The lithium metal anode and cathode current collectors, and how anode and cathode windings are electrically coupled, are described in detail in copending application Ser. No. 09/388,733 titled "All Solid State Electrochemical Device and Method of Manufacturing," now U.S. Pat. No. 6,664,006 which is incorporated by reference as if reproduced in full below. Because of the context of development, the various embodiments are described with regard to battery cells having the solid polymer electrolyte construction. However, the description in this manner should not be construed as a limitation of the invention to only battery cells with solid polymer electrolytes, as the method and structures described herein may be used with any wound combination of web substrates such as lithium metal cells, lead acid cells, nickel-cadmium, nickel-metal-hydride, alkaline, zinc air, and the like. Further, and as will be described more fully below, the methods and structures are equally applicable to devices such as film capacitors, electrochemical capacitors, fuel cells, and the like.

The preferred embodiments are directed to consecutively wound or stacked battery systems. The process of building a consecutively wound or stacked battery system preferably starts by winding of the various layers of a first battery cell around a mandrel. Once the proper length of battery cell material has been wound (the length corresponding to capacity of the cell), the winding material is cut using known techniques to create a first battery cell of the winding. After wrapping at least one full turn of insulating material, a second battery cell is wound over the first cell. The process continues for any number of battery cells, each layer wound consecutively over the previous layer. Thus a multiple cell, yet single or integral unit, battery is produced.

FIG. 1 shows a simplified perspective end view of a plurality of consecutively wound or stacked battery cells of the preferred embodiments. In particular, FIG. 1 shows an innermost cell 10, a middle cell 12, and an outermost cell 14. As can be seen in FIG. 1, the various cells are wound together to form an integral unit 2 having multiple battery cells. FIG. 2 shows a perspective view of the integral battery unit 2 of FIG. 1 with the cells shifted about their common axis 16 to exemplify how the cells of the preferred embodiment are substantially coaxial in their placement. It must be understood that the battery cells 10, 12, 14 of the preferred embodiment are not separable as shown in FIG. 2, but that FIG. 2 merely exemplifies the preferred coaxial nature of the consecutively wound battery cells. While three battery cells are exemplified in FIGS. 1 and 2, any number of consecutively wound battery cells may be used and still be within the contemplation of this invention. Further, and as discussed below, devices other than battery cells may be consecutively wound or stacked, e.g. capacitors and fuel cells, and these too would be within the contemplation of this invention. Further still, the windings need not be circular as exemplified in FIGS. 1 and 2. The various cell layers may be consecutively wound around any suitable shape such as elliptical, rectangular, and the like, or the windings deformed to any suitable shape after removal from the mandrel.

FIGS. 1 and 2 provide a high level overview of the preferred arrangements for the consecutively wound cells of the preferred embodiments. FIG. 3 shows an exemplary cross-sectional view of one battery cell, taken substantially along lines 3—3 of FIG. 2. Although taken along line 3—3 of FIG. 2, cutting the outermost battery cell 14, the description that follows is equally applicable to any of the battery cells present. FIG. 3 shows that each turn of the exemplary battery cell is made up of a plurality of layers of material. Though FIG. 3 shows only the cross-section of one turn to simplify the drawings, any number of turns may be used for a particular cell, depending upon the desired amperage capacity and the diameter of the winding. The battery cell comprises at least an anode layer 18, an electrolyte layer 20, and a cathode layer 22 which are preferably as thin as possible. Using technology in existence at the time of writing this specification, these layers may be as small as 0.2 microns each; however, as film technology advances, the thickness of sheets of material may become thinner, and preferably the thinnest layers available are preferred. In the most preferred embodiments, the anode layer 18 is a lithium coated plastic sheet, the electrolyte layer 20 is preferably a solid polymer electrolyte, and the cathode layer 22 is preferably a lithium coated plastic sheet, as described more fully in the application Ser. Nos. 09/388,741 (now U.S. Pat. No. 6,645,675) and 09/388,733 (now U.S. Pat. No. 6,664,006) incorporated by reference above. The layers of material that make up the battery cell of the preferred embodiments using film technology in existence as of the writing of this specification may be less than 30 microns thick, meaning that tens, hundreds or thousands of turns may be used depending on the diameter of the winding and the desired amperage capacity of the particular battery cell.

Consider for purposes of explanation a consecutively wound battery system having two battery cells, a cross-section of a portion of the windings of the two cells exemplified in FIG. 4A. Thus, portion 24 represents the cross-section of a first battery cell (that may comprise hundreds or thousands of turns), and portion 26 represents the cross-section of a second battery cell (that may also comprise hundreds or thousands of turns) separated by an insulating layer 64. Each of the portions 24, 26 comprises at least an anode layer 18, an electrolyte layer 20 and a cathode layer 22. Because in an embodiment the anode and cathode layers extend beyond the electrolyte layer, there are two possible configurations for the multiple cell battery having two battery cells—the anode layers extending in the same axial direction (with the cathode layers extending in a second axial direction), or the anode layer from a first cell extending the same direction as the cathode layer of the second cell. These configurations allow for several different advantageous battery solutions from the integral unit multiple cell battery.

Still referring to FIG. 4A, consider the case where the anode layers of the first and second cell extend in different directions, anodes marked "A" and cathodes marked "C." By electrically coupling the anode and cathode on one axial end, a series connection is made. If the preferred lithium battery is used, each cell generates approximately 3.6 Volts. By connecting the batteries in series, a battery system producing approximately 7.2 Volts is achieved. FIG. 4B represents the series combination in a graphical form with jumper 28 representing the electrical coupling of an anode and cathode on one axial end.

Now consider the consecutively wound two cell battery system where the anodes and cathodes of the battery cells extend in the same direction, as exemplified in FIG. 4C (again using the short-hand notation). By electrically coupling the anodes, exemplified by jumper 30, and electrically coupling the cathodes, exemplified by jumper 32, a battery system is created having a total amperage capacity equal to the sum of the two battery cells. The battery cells in the configurations of FIGS. 4B and 4C need not necessarily be coupled at all. Indeed, it is possible that each cell may be used independently. If the battery cells are not intended to be coupled into a series or parallel connection, it is also possible that each of these cells may have varying amperage capacities. This could be useful, for example, if the device operated by the multiple cell battery has critical and non-critical devices.

Figure 6C:
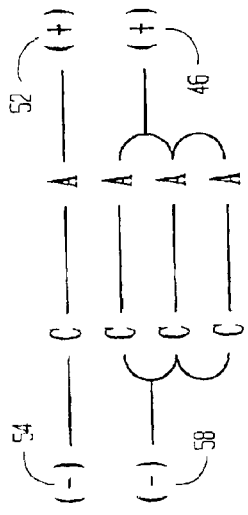
FIG. 6C shows, in graphical form, a way to couple four battery cells of a consecutively wound battery system to produce two output voltages having varying amperage capacities.

Although any number of cells may be wound together in the manner described, consider a set of three cells, exemplified graphically in FIG. 5A. By selectively coupling anodes to cathodes, as exemplified by jumpers 34 and 36, in the three cell system, a series connection is made. If the preferred lithium cells are used, each cell producing approximately 3.6 Volts, then the system shown in FIG. 5A produces an overall voltage of 10.8 Volts. FIG. 5B exemplifies a three battery cell system in which only two of the three cells are coupled in parallel, jumpers 38 and 40, thus producing an integral battery unit having voltage sources with different amperage capacities. Likewise, FIG. 6A graphically exemplifies a consecutively wound or stacked battery having four cells jumpered in such a way that two output voltages are provided. If each of the cells is a lithium cell producing approximately 3.6 Volts, then the integral unit consecutively wound battery produces two independent 7.2 Volt sources. FIG. 6B exemplifies a four cell integral unit battery that can be switched between balanced two-source operation and series operation. With switch 42 closed, the system produces 14.4 Volts from the negative terminal 44 to the positive terminal 46. With switch 42 open, a 7.2 Volt supply is produced between terminals 44 and 48, and another 7.2 Volt supply is produced between terminals 50 and 46. FIG. 6C graphically exemplifies yet another configuration. If each of the cells of the multiple cell battery exemplified in FIG. 6C is capable of generating 400 milliamps of current, what is provided is a multiple current battery system with 400 milliamps provided at terminals 52 and 54, and 1200 milliamps provided at terminals 56 and 58. The examples given in FIGS. 4(B, C), 5(A, B) and 6(A–C) are merely exemplary. One of ordinary skill in the art, now understanding how the consecutively wound battery cells may be connected in series and parallel combinations could easily devise many equivalent combinations that are not explicitly shown in these examples. Moreover, any number of cells may be consecutively wound or stacked, and therefore two or more consecutively wound battery cells may be provided and may be connected and interconnected in many different ways to produce many operating voltages and operating currents.

Each battery cell of the consecutively wound battery system comprises a plurality of turns of the layered anode/electrolyte/cathode material. Referring again to FIG. 3, preferably the anode layer or layers 18 are offset in a first axial direction (the axis 16 direction is shown in FIG. 3, but is not intended to be to scale or in proper relationship to the center of the winding of the exemplary battery cell) and the cathode layer or layers are offset in a second axial direction. Thus, traditional electrical current flow (which is opposite of electron flow) preferably leaves the battery cell from the anode layer 18, and enters the battery cell through the cathode layer 22. However, given that each battery cell may comprise tens, hundreds, or even thousands of turns, and further that each of the anode and cathode layers may only be less than few microns thick, preferably, electrical contact is not made at only a single location of the otherwise continuous anode material extending beyond the electrolyte. Likewise, current flowing back to the battery preferably does not enter at a single point along the otherwise continuous cathode layer extending beyond the electrolyte. Rather, the portions of the anode layer extending beyond the electrolyte are preferably electrically connected by the use of some form of conductive coating. Likewise, the portions of the cathode layer extending beyond the electrolyte are also preferably electrically coupled using a conductive coating.

Figure 7C:
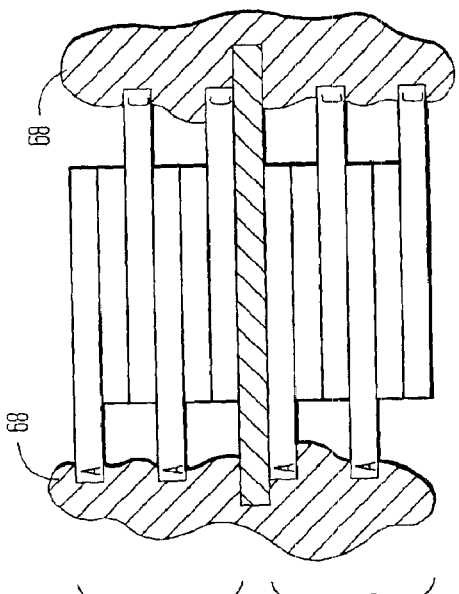
FIG. 7C shows the system of FIG. 7B with a portion of the shooping removed to electrically isolate each battery cell.
Figure 7A:
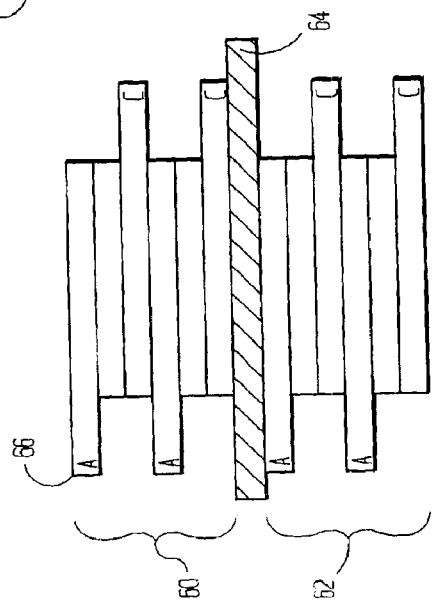
FIG. 7A shows a cross-sectional view of a consecutively wound battery system having two battery cells separated by an insulating layer.

For purposes of explaining how the conductive coating couples the various turns of each battery cell, and likewise may couple different battery cells within the same consecutively wound battery system, reference is now made to FIG. 7A. FIG. 7A shows a cross-sectional view of a consecutively wound battery system having two battery cells 60 and 62, each battery cell 60, 62 having an exemplary two turns. Preferably, a layer of insulating material 64 is disposed between each battery cell (preferably a sheet of polyester), and that layer of insulating material 64 preferably extends at least 0.5 millimeter beyond the offset of the anode and cathode material. Though FIG. 7A is merely a cross-section of a winding, it will be understood that the insulating material 64 preferably makes at least one complete wrap around the consecutively wound battery system. Referring to the upper or outermost battery cell 60 of FIG. 7A, inasmuch as the anode material extending beyond the electrolyte is a continuous sheet, it would be possible to merely tap or electrically contact the windings at one location, for example location 66, and extract current from the battery cell 60. However, tapping the otherwise continuous anode at one location may be difficult to do given the relatively small thickness of the anodes (and cathodes), and further tapping at only a single location may result in significant heating and resistance losses. Rather, axial or rolled ends of the consecutively wound battery system are preferably coated with a sprayed-on metal coating, a process known as shooping, as described in the copending application Ser. No. 09/388,733 (now U.S. Pat. No. 6,664,006) incorporated by reference above. The end-coating could equivalently be accomplished with conductive adhesives, conductive epoxies, solder paste or other functional means. It is also possible that the various anode and cathode turns could be connected by physical means, for example by tab welding a plurality of tabs connected at the anode and/or cathode in various locations, but this is not preferred.

FIG. 7B exemplifies the consecutively wound battery system after the preferred shooping has taken place, but prior to any further steps. In particular, FIG. 7B shows that each of the axial or rolled ends are covered by conductive shooping material 68. Inasmuch as the shooping material is preferably conductive, it may be seen that the two independent battery cells 60 and 62 of FIG. 7B are effectively connected in parallel after shooping alone. If it is desired that the batteries in this configuration be connected in parallel, then no further steps need be taken with respect to the shooping material save the coupling of the shooping to the terminals of the battery, which may be done using aluminum, copper or nickel wires using known techniques. Preferably, however, the shooping material is not left in the configuration exemplified in FIG. 7B, and instead, a portion of the shooping material is removed.

Removing the shooping material preferably comprises brushing each axial end of the shooped consecutively wound battery system, which wipes away or removes portions of the shooping material. By brushing the axial or rolled ends of the consecutively wound battery system in this manner, the various cells may be electrically isolated from each other across the layer of insulating material 64.

FIG. 7C shows the two cell consecutively wound battery system with a portion of the shopping material removed. In particular, the shopping material extending beyond the insulating layer 64 in each direction is preferably removed by the brushing procedure, ultrasonic cleaning or knife trimming. Brushing machines suitable for performing this task may be purchased from Midland Machine Company of Carpenterville, Ill. 60110 U.S.A., Arcotronics Italia SpA, 40037 Sasso Marconi (BO) Italy, 2A S.R.L., Bologna Italy, Metar Machines—Montena Components SA, Fribourg, Switzerland. What preferably remains is the shooping material electrically coupling, for example, all the anode layers of the upper battery cell 60, and likewise all the anode layers of the lower battery cell 62, but because the shooping has been brushed off at least as far down as the end of the layer of insulating material 64, preferably no shooping extends across that insulating barrier, and thus these anodes are now electrically isolated. An equivalent description applies to the shooping material 68 on the side where the cathodes extend beyond the electrolyte.

Figure 10:
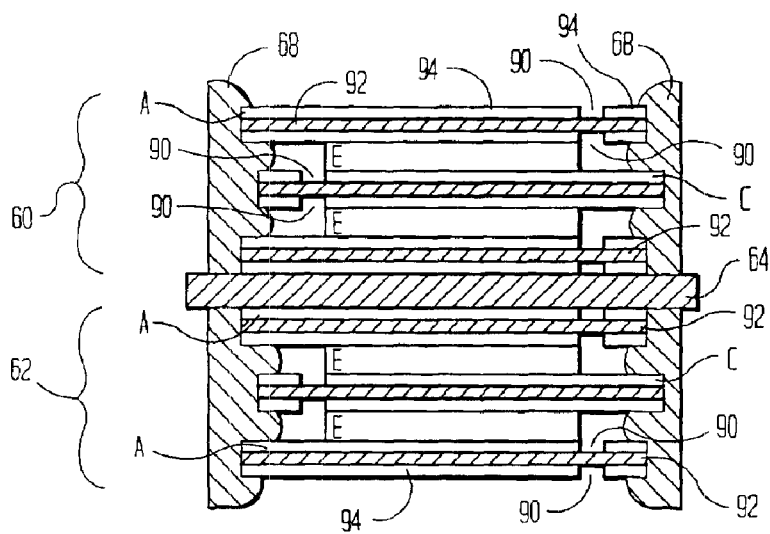
FIG. 10 shows a cross-sectional view of a consecutively wound battery where the anode and cathode are not offset, or are only minimally offset, using a dielectric lane technique.

The embodiments shown in FIGS. 7A–C are constructed by offsetting the anode and cathode material. A second embodiment for coupling the turns of a battery cell, and also coupling battery cells to each other in the stacked configuration, is shown in FIG. 10. In this second embodiment, the anode and cathode material is offset only slightly, or preferably not at all. In this way, the shooping 68 electrically contacts the anode and cathode layers on both sides. In order that the battery cells are not shorted by the shooping, however, a series of dielectric lanes 90 are preferably manufactured into the anode and cathode sheets such that the portion of the anode or cathode in contact with the shopping 68 is electrically isolated from the portion of the anode or cathode in contact with the electrolyte. This electrical isolation is possible because of the construction of the anode and cathode sheets.

The anode and cathode sheets used to create battery cells of the preferred embodiment are formed on sheets or meshes of insulating material such as polyester. The sheets or meshes are then coated with thin layers of metal, the precise type of metal depending on the chemistry of the battery cell. The lithium battery cells of the preferred embodiment are described in detail in copending application Ser. Nos. 09/388,741 (now U.S. Pat. No. 6,645,675) and 09/388,733 (now U.S. Pat. No. 6,664,006). Referring again to FIG. 10, anode sheets comprise an insulating material 92 coated with at least one metal layer 94. The dielectric lane 90 thus comprises a portion of metal layer 94 removed, or preferably not deposited during the coating process. Thus, while anode metal 94 may electrically contact the shooping 68 on both sides, it is electrically isolated on one side from the portion of the metal in contact with the electrolyte (labeled "E" in FIG. 10). Having the shooping contact both the anode and cathode on each side provides better mechanical strength of the stacked battery system, better handles swelling caused by temperature fluctuations, and provides better heat dissipation. Also, the arrangement where little or no offset of the layers is required provides many additional manufacturing benefits in the stacked configuration, discussed more fully below.

If it is known in advance the electrical configuration desired for the consecutively wound battery system (series connections, parallel connections), it is possible to selectively add different sizes of insulating material (axial lengths) to implement the desired system. For example, and referring again to FIG. 4B, if it is known in advance that a series connection is to be made, then the layer of insulating material 64 may be of selected axial length and placement on the wound system such that it does not extend far beyond the electrolyte layer between the two battery cells in one axial direction. On the rolled end where the insulating material does not extend, shooping alone may be all that is needed to couple the cathode and the anode (the shooping material acts as the jumper 28). In this exemplary case of FIG. 4B, however, the other axial end (where the positive and negative terminals need to connect), preferably has the insulating material extending as described, and the brushing removes excess so as to electrically isolate the two terminals. Preferably, however, the insulating layers between each consecutively wound battery cell extend beyond the anode and/or cathode layers in both directions, and each end is preferably brushed so as to electrically isolate the anodes and cathodes of each consecutively wound battery cell. To the extent any cell or cells need to be connected for a particular application, this is preferably done by wires or other electrical conductors connecting the various portions of shooping material. In this way, especially for the higher order consecutively wound battery systems (having three or more battery cells), the precise set-up of the consecutively wound battery system need not be determined until a customer makes an order, the order filled from a previously wound, shooped and brushed system.

Construction of a consecutively wound battery system preferably starts by winding a plurality of layers of a battery cell initially around a mandrel, winding at least one turn of insulated material, and then winding another battery cell layer around the first cell and insulating material, and so on until the desired number of cells have been wound. Preferably thereafter, the consecutively wound battery system is removed from the mandrel and the shooping process performed. In one embodiment, this mandrel may have a relatively small diameter, for example less than one centimeter. In a second embodiment, however, the mandrel diameter may be large, on the order of two to five feet, but preferably three feet. After winding a plurality of battery cells and shooping as described, in this embodiment the consecutively wound battery system is preferably cut on one side along a radial plane intersecting the axis of the winding and laid flat. The consecutively wound battery is thus conformed to be a substantially flat or stacked battery system. All the previous discussion regarding the many ways in which the various cells of such a stacked battery may be connected still apply, except that the battery is now stacked instead of consecutively wound (although it was preferably built in a consecutively wound fashion first). While a stacked battery system in this size may find application directly (approximately twelve feet in length if wound on a three foot diameter mandrel), preferably the stacked system is used to provide batteries having custom amperage ratings.

Figure 8:
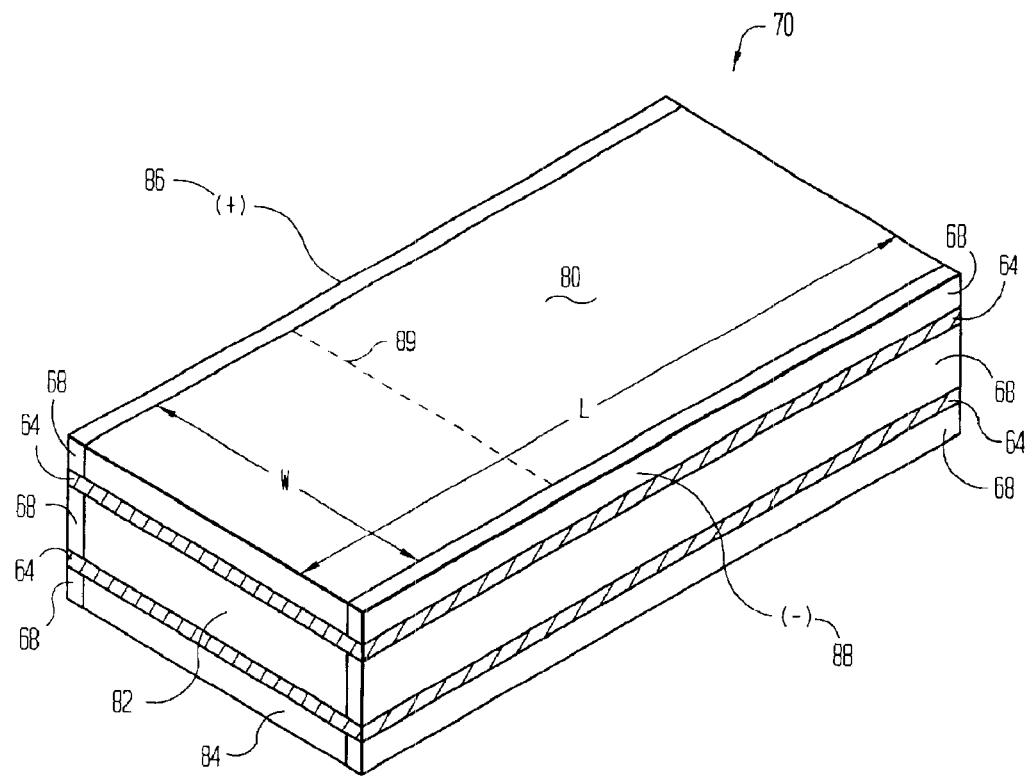
FIG. 8 shows a consecutively wound battery system laid flat to become a stacked battery system.

FIG. 8 exemplifies a stacked cell battery system 70 constructed using the technique whereby the anode and cathodes are offset from each other, rather than the dielectric lane technique which is discussed below. In particular, FIG. 8 shows an upper cell 80 (which may have been an outermost cell wrapped around the mandrel during the wrapping process), a center cell 82 and a bottom cell 84 (which bottom cell may have been an innermost cell wrapped around the mandrel in the winding process). Separating each of the layers of cell material are insulating layers 64 (which may also be present beneath the lower battery cell 84 and above the uppermost cell 80, but are not shown to simplify the drawing). As discussed with respect to the consecutively wound battery systems, preferably each axial end of the stacked battery is shooped, and then a portion of that shooping removed such that the anode and cathode layers extending beyond the electrolyte for each battery cell are electrically coupled, with the cells separated by the insulating layer. In particular, FIG. 8 shows shooping 68 on the near face of the perspective view of FIG. 8, shooping 68 separated by the layers of insulating material 64. As the configuration stands in FIG. 8, it may be possible to take positive traditional current flow from a positive terminal 86 for the uppermost battery cell 80, and return current to the battery cell 80 by way of the negative terminal 88, and so on for the remaining cells.

What should be understood with respect to FIG. 8 is that regardless of the length (labeled L in the drawings) or the width (labeled W in the drawings), the battery voltage is still the same. If the battery cell of use is the preferred lithium cell having a solid polymer electrolyte, then the voltage developed between the positive terminal 86 and the negative terminal 88 will be approximately 3.6 Volts. The length and width parameters, however, control the battery capacity or amperage rating. That is, the length and width of the battery in this configuration (and the same parameters in a circular form for the consecutively wound configuration) control how much current each particular battery cell is capable of delivering. Thus, the stacked battery system exemplified in FIG. 8 presents the possibility of custom capacity batteries. In particular, the stacked battery could be made on the large diameter mandrel and flattened as shown in FIG. 8, and then cut in varying sizes, depending upon orders from customers for battery systems. Not only is it possible to provide multiple voltages by selectively jumpering the individual battery cells, but it is also possible to provide varying amperage capacities for those multiple voltages.

For purposes of illustration, consider that the stacked battery system exemplified in FIG. 8 has a one unit width (W=1) and a twelve unit length (L=12), and in this configuration each cell is capable of providing 1200 milliamps of current at rated voltage. Thus, if each battery cell is the preferred lithium cell, then the stacked battery system is capable of providing three independent sources of 3.6 Volt power at 1200 milliamps. Consider though that a customer desires a 10.8 Volt system having the capability of providing 1200 milliamps. In such a circumstance, the twelve unit length stacked battery system of FIG. 8 could be cut, for example along dashed line 89, to have a four unit length, and then each of the battery cells connected in series to provide the required 10.8 Volts. That is, by cutting the exemplary system at a four unit length, each battery cell thus becomes capable of providing 400 milliamps at 3.6 Volts. By connecting the cells in series, it is possible to achieve the desired 10.8 Volts at the required 400 milliamps of current. Because in the preferred embodiment the shooping between each respective layer is brushed off so as to isolate the layers, it will be required to provide physical jumpers between the shooping layers to achieve the series connections of this example. Further, cutting of the stacked battery across its width (to achieve a desired length) needs to be accomplished in such a way that the anodes and cathodes of the various battery cells do not short with each other or across their respective electrolytes. Cutting of the stacked cell in this manner is preferably accomplished by laser etching, but may equivalently take place by electrode arcing or physical sawing.

What is important to realize from the above example, however, is that although a portion of the overall stacked battery system was cut to provide a desired voltage and current rating (a four unit length), the remaining stacked battery system (in the exemplary case having a remaining eight unit length), is still available for use, which may involve further cutting for other custom amperages and voltages. Thus, this embodiment has particular commercial attractiveness as multiple batteries, of various voltages and amperages, may be produced from a single stacked battery system.

Figure 11:
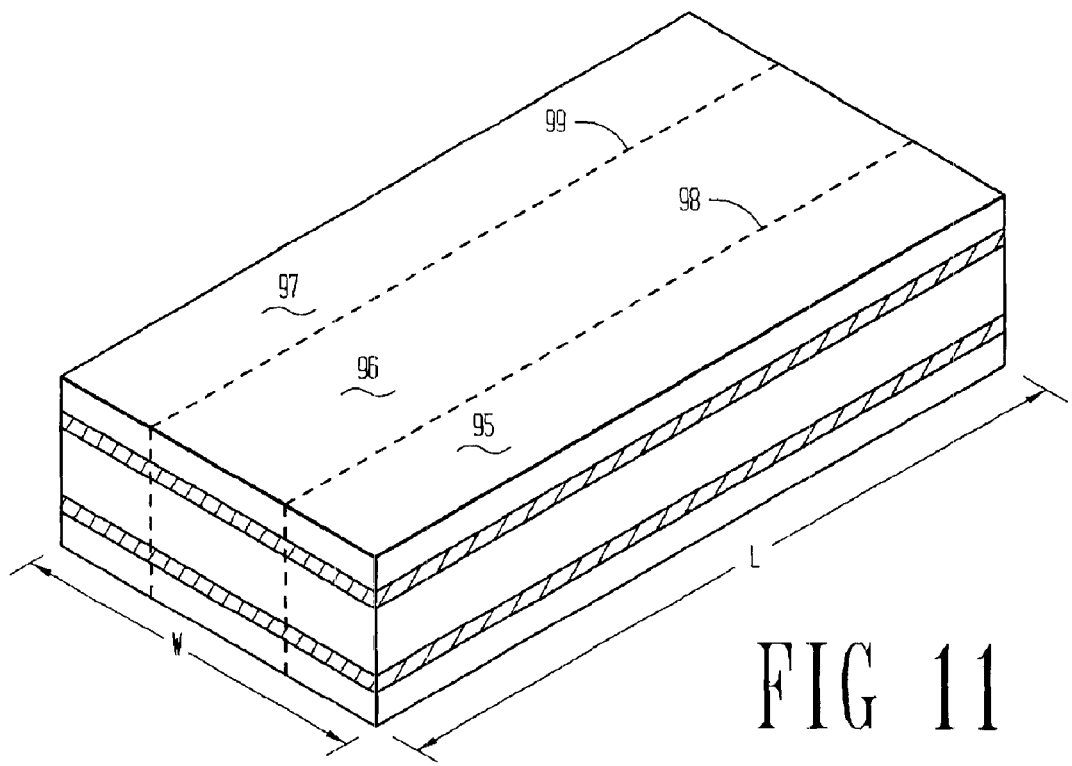
FIG. 11 shows a perspective view of a stacked battery system comprising several strands or ropes.

The discussion with regard to FIG. 8 assumed a construction configuration of shifted anode and cathode layers. In this shifted anode and cathode configuration, it would not be possible to cut the stacked system along its length (to produce a particular width) and shoop the cut edges, because in so doing, the anode, cathode and electrolyte would have no offset. Shooping the cut edge in this circumstance would short the anodes, cathodes and electrolytes. However, using the dielectric lane technique, it is possible that the stacked battery system may be cut at predetermined widths, in addition to cutting to a desired length, which further adds to the manufacturing flexibility of the stacked battery system. FIG. 11 shows a perspective view of a stacked battery that may be cut along its length (to produce a desired width) in addition to cutting along its overall width (to produce a desired length) using the dielectric lane technique. In particular, this embodiment is constructed similar to that exemplified in FIG. 8—winding the various cell layers over a large diameter mandrel, and cutting the winding to be laid flat. However, prior to winding, the number and respective widths of the battery strips or ropes (labeled 95, 96 and 97 in FIG. 11) are determined. Thereafter, the anode and cathode sheets (not individually shown in FIG. 11) are masked and coated forming dielectric lanes proximate to the desired widths. In the exemplary stacked battery of FIG. 11 having three strips or ropes, each sheet (anode or cathode) will have three sets (a set being a dielectric lane on top and bottom of the sheet in registration) of dielectric lanes. As the sheets of anode and cathode material are rolled on the mandrel, preferably razors cut the sheets (as well as the insulating material as it is fed to the mandrel between cells), for example along dashed lines 98 and 99 of FIG. 11.

Referring again briefly to FIG. 10, it is seen that the electrolyte layers, labeled "E," are bounded as to width by the dielectric lanes 90. Building a stacked multiple cell, multiple strand stacked battery using the dielectric lane technique thus implies that electrolyte sheets are preferably cut to an appropriate width prior to winding, and then fed to the winding process at the appropriate location (centered between dielectric lanes in each strand or rope). Once wound and cut to be laid flat, the various strands or ropes are separated (in the exemplary system of FIG. 11 along dashed lines 98 and 99) and then shooped. Each strand or rope thereafter has a cross-section similar to FIG. 10. Depending on the desired amperage capacity, each rope may be cut again to have a particular length, with the remaining portion available to fill subsequent orders.

Figure 9:
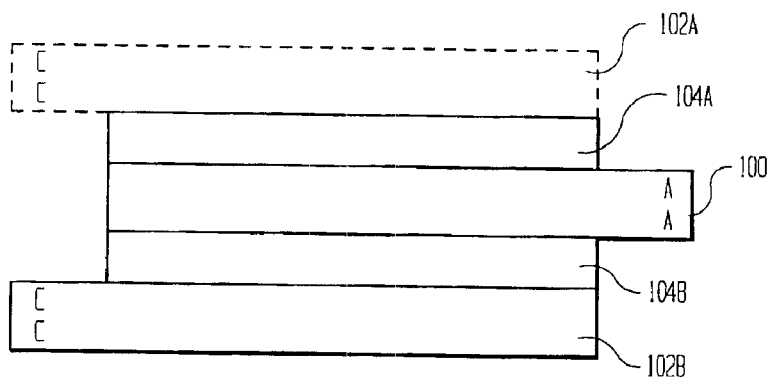
FIG. 9 shows a cross-section of a battery cell of the preferred embodiment.

The description of the embodiments above discloses that a battery cell comprises at least an anode layer, an electrolyte layer, and a cathode layer. While a consecutively wound or stacked battery system having battery cells of this nature would indeed be operational, preferably, however, each battery cell effectively comprises two cells. FIG. 9 shows a cross-section of a single turn of a battery cell of the preferred embodiment. In particular, the preferred battery cell comprises a double-sided anode layer 100 in the center between two double-sided cathode layers 102A, B. Between the double sided anode layer 100 and each double-sided cathode layer 102A, B resides an electrolyte layer 104A,B respectively. Effectively, the layered materials of FIG. 9 are two independent battery cells sharing an anode 100. The upper double-sided cathode layer 102A is shown in FIG. 9 in dashed lines to exemplify that this layer is preferably not an independent sheet fed to the rolling process, but is actually the same double-sided cathode layer as 102B except on the next revolution. Throughout this specification, and also in the claims, reference to a wound or stacked battery cell in a battery system should be read to include not only the minimum required layers for a battery cell (anode layer, cathode layer, and electrolyte layer), but also should be read to include battery cell systems such as that exemplified in FIG. 9. Depending upon the requirements for any particular wound or stacked battery system, it may be further possible to have each battery cell (as that term is used) to include any number of stacked layers sharing anodes and/or cathodes in the manner exemplified in FIG. 9.

As discussed in the Background section, it may also be desirable in some situations to wire batteries in parallel with capacitors, for example to supply starting currents for motors and the like. One of the embodiments of the present invention contemplates a multiple wound or stacked battery systems that comprises a wound or stacked battery cell and also comprises a wound or stacked capacitor. Stated otherwise, any of the consecutively wound battery cells discussed herein could be replaced with a consecutively wound or stacked capacitive cell constructed in much the same way. Thus, the shooping and/or external jumpers between isolated shooped regions may be used to couple capacitors in parallel with battery cells in consecutively wound systems. In addition to, or in place of, any of the battery cells discussed herein, fuel cells could be used to supply current, and this too would be within the contemplation of this invention. A fuel cell is an electrochemical energy conversion device that converts hydrogen and oxygen into electricity and heat. Fuel cells can be recharged while in operation. Fuel cells are similar in construction to a battery in that single cell and bipolar anode/electrolyte/cathode designs are employed. A wide variety of flexible substrates such as catalyzed membranes of hydrophobized porous carbon paper, carbon cloth, or polymer films are sandwiched between flexible anode and cathode collector plates. Preferably, the fuel cell or fuel cell stack is the first windings of the consecutively wound unit. By being the first winding, a winding core can be used that is constructed in such a way as one end to serve as anode and cathode vent exits and the other opposite end as the anode and cathode entry feeds. Further, a completed and encased cylindrical or oval finished fuel cell could serve as the base core or mandrel for the secondary or multiple consecutively wound battery or capacitor windings. Alternatively, a cylindrically shaped encased fuel cell could serve as the outermost portion of the consecutively wound unit, whereby the inner vacant hole is occupied by consecutively wound batteries and/or capacitors.

The above discussion is meant to be illustrative of the principles and various embodiments of the present invention. Numerous variations and modifications will become apparent to those skilled in the art once the above disclosure is fully appreciated. For example, it was discussed above that in addition to lithium batteries having solid polymer electrolyte as battery cells, that battery cells using viscous electrolyte or fuel cells could be used. In this case, it may be necessary to provide access to the electrolyte layers for filling (in the case of the viscous electrolyte), as well as the exit of flue gas during the charging process. In such a circumstance, it is possible that rather than metal end-spraying or shooping an entire axial or rolled end of the consecutively wound battery system, that only a portion may be shooped to allow this access, and this too would be within the contemplation of this invention. Relatedly, if a fuel cell is added to the consecutively wound or stacked battery in addition to or in place of one of the battery cells, it may be necessary for oxygen to enter the system, and partially shooping one or both of the axial ends could accomplish this task. Throughout the discussion of the preferred embodiments above, it is discussed that the consecutively wound battery system had an axis, implying that the winding takes place such that the wound battery system has a circular cross-section; however, while this is preferred, it is not required and thus any winding of battery cells, fuel cells, capacitive layers, and the like in which these various layers are consecutively wound on top of each other would be within the contemplation of this invention. Further, in cases where a parallel configuration of batteries is desired, it is possible that separate battery cells of the consecutively wound system could share anode or cathode layers, or both. The preferred method of producing the stacked battery system is by winding the various cells, and then cutting the winding to produce the stacked version; however, it is possible, and within the contemplation of this invention, to create the stacked system by building the stack directly. It is intended that the following claims be interpreted to embrace all such variations and modifications.

What is claimed is:

1. A method comprising:
   wrapping a plurality of turns of a battery cell to make a wound battery cell;
   cutting the wound battery cell to create a stacked battery cell, the amperage capacity of the stacked battery cell based on a length of the stacked battery cell; and
   removing a portion of the length of the stacked battery cell to adjust the amperage capacity of the stacked battery cell.

2. The method as defined in claim 1 wherein wrapping a plurality of turns of the battery cell to make the wound battery cell further comprises wrapping the plurality of turns of the battery cell around a substantially cylindrical mandrel thus creating a substantially cylindrical shaped wound battery cell.

3. The method as defined in claim 2 wherein wrapping the plurality of turns of the first battery cell around a cylindrical mandrel further comprises wrapping the plurality of turns of the first battery cell around a mandrel having a diameter of at least two feet.

4. The method as defined in claim 3 wherein wrapping the plurality of turns of the battery cell around a mandrel having a diameter of at least two feet further comprises wrapping a plurality of turns of the first battery cell around the mandrel having a diameter of at least two feet and less than five feet.

5. The method as defined in claim 4 wherein wrapping the plurality of turns of the battery cell around the mandrel having a diameter of at least two feet and less than five feet further comprises wrapping the battery cell around the mandrel having a diameter of approximately three feet.

6. The method as defined in claim 2 wherein cutting the wound battery cell to create a stacked battery cell further comprises:
   cutting the substantially cylindrical shaped wound battery cell on one side substantially parallel with an axis of the cylindrical shape; and
   laying the cut substantially cylindrical shaped wound battery to be substantially flat to become the stacked battery cell with a circumference of the cylindrical shape becoming the length of the stacked battery cell.

7. The method of claim 1, further comprising, prior to cutting and removing, winding a second battery cell a plurality of turns around the wound battery cell.

8. The method of claim 7, wherein winding the second battery cell a plurality of turns around the wound battery cell comprises winding the second battery cell a plurality of turns around the wound battery cell where the wound battery cell produces a first voltage and the second battery cell produces a second voltage.

9. The method of claim 7, further comprising coupling the wound and second battery cells in series.

10. The method of claim 7, further comprising coupling the wound and second battery cells in parallel.

11. The method of claim 7, further comprising, prior to cutting and removing, winding a third battery cell a plurality of turns around the second battery cell.

12. The method of claim 11, further comprising coupling the wound, second and third battery cells in series.

13. The method of claim 11, further comprising coupling the wound, second and third battery cells in parallel.

14. The method of claim 11, further comprising coupling two of the first, second or third battery cells in parallel.

15. A method comprising:
   wrapping a plurality of turns of a first battery cell;
   wrapping a plurality of turns of a second battery cell around the first battery cell to make a consecutively wound battery system;
   cutting the consecutively wound battery system to create a stacked battery system, the amperage capacity of each cell of the stacked battery system based on a length of the stacked battery system; and
   removing a portion of the length of the stacked battery system to adjust the amperage capacity each cell of the stacked battery system.

16. The method as defined in claim 15 wherein the wrapping steps further comprise:

wrapping the plurality of turns of the first battery cell around a substantially cylindrical mandrel; and wrapping the plurality of turns of the second battery cell around the first battery cell, thus creating a substantially cylindrical shaped wound battery system.

17. The method as defined in claim 16 wherein wrapping the plurality of turns of the first battery cell around a substantially cylindrical mandrel further comprises wrapping the plurality of turns of the first battery cell around a mandrel having a diameter of at least two feet.

18. The method as defined in claim 17 wherein wrapping the plurality of turns of the first battery cell around a mandrel having a diameter of at least two feet further comprises wrapping a plurality of turns of the first battery cell around the mandrel having a diameter of at least two feet and less than five feet.

19. The method as defined in claim 18 wherein wrapping the plurality of turns of the first battery cell around the mandrel having a diameter of at least two feet and less than five feet further comprises wrapping the battery cell around the mandrel having a diameter of approximately three feet.

20. The method as defined in claim 15 wherein cutting the wound battery system to create a stacked battery system further comprises:

cutting the substantially cylindrical shaped consecutively wound battery system on one side substantially parallel with an axis of the cylindrical shape; and laying the cut substantially cylindrical shaped consecutively wound battery system to be substantially flat to become the stacked battery system with a circumference of the cylindrical shape becoming the length of the stacked battery cell.

21. The method of claim 15, further comprising coupling the first and second battery cells in series.

22. The method of claim 15, further comprising coupling the first and second battery cells in parallel.

23. The method of claim 15, further comprising winding a third battery cell a plurality of turns around the second battery cell.

24. The method of claim 23, further comprising coupling the first, second and third battery cells in series.

25. The method of claim 23, further comprising coupling the first, second and third battery cells in parallel.

26. The method of claim 23, further comprising coupling two of the first, second or third battery cells in parallel.

* * * * *